(No Model.)

R. B. CARR.
WINDING MECHANISM FOR TOWER CLOCKS.

No. 511,408. Patented Dec. 26, 1893.

WITNESSES
A. D. Harrison.
M. W. Jackson

INVENTOR
R. B. Carr
by Wright Brown Crosley
Attys.

UNITED STATES PATENT OFFICE.

RUFUS B. CARR, OF BOSTON, MASSACHUSETTS, ASSIGNOR OF ONE-HALF TO THE E. HOWARD WATCH AND CLOCK COMPANY, OF SAME PLACE.

WINDING MECHANISM FOR TOWER-CLOCKS.

SPECIFICATION forming part of Letters Patent No. 511,408, dated December 26, 1893.

Application filed December 10, 1892. Serial No. 454,690. (No model.)

*To all whom it may concern:*

Be it known that I, RUFUS B. CARR, of Boston, in the county of Suffolk and State of Massachusetts, have invented certain new and useful Improvement in Winding Mechanism for Tower-Clocks, of which the following is a specification.

This invention relates to mechanism for winding tower clocks by the use of a motor actuated by any suitable power, such as electricity, water, &c., and has for its object, first to prevent damage to the mechanism by a continuance of the operation of the motor after the winding operation has been completed, and secondly to enable a single motor to wind a plurality of parts such as the time and the striking parts or movements of the clock, either simultaneously or singly.

To these ends the invention consists in the improvements which I will now proceed to describe and claim.

Figure 1:
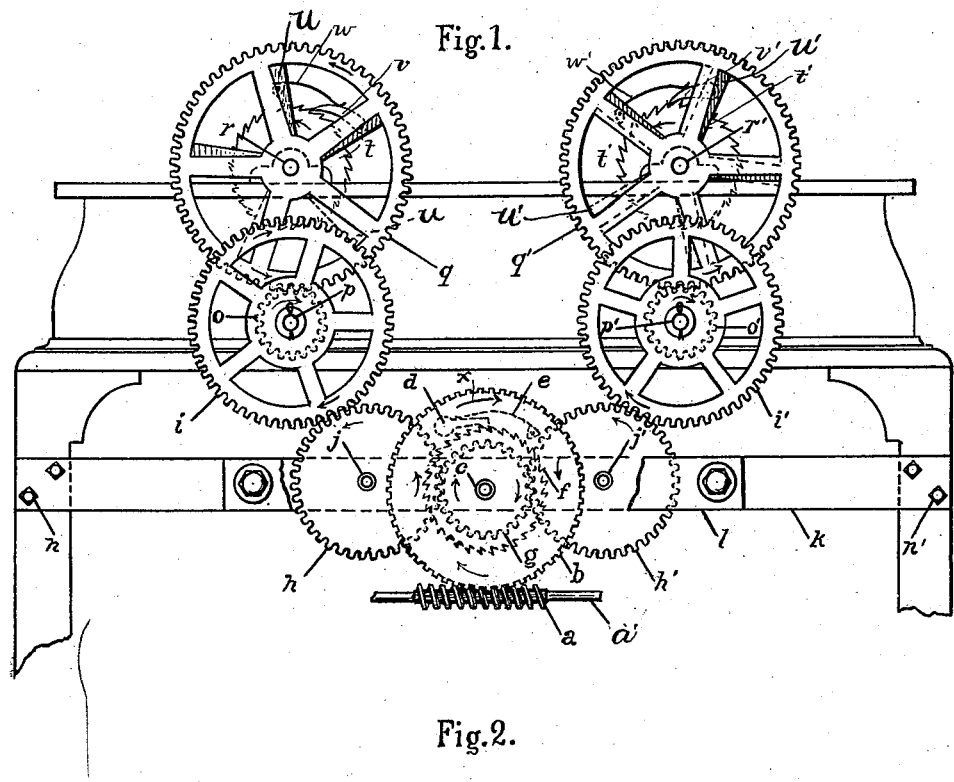
Figure 2:
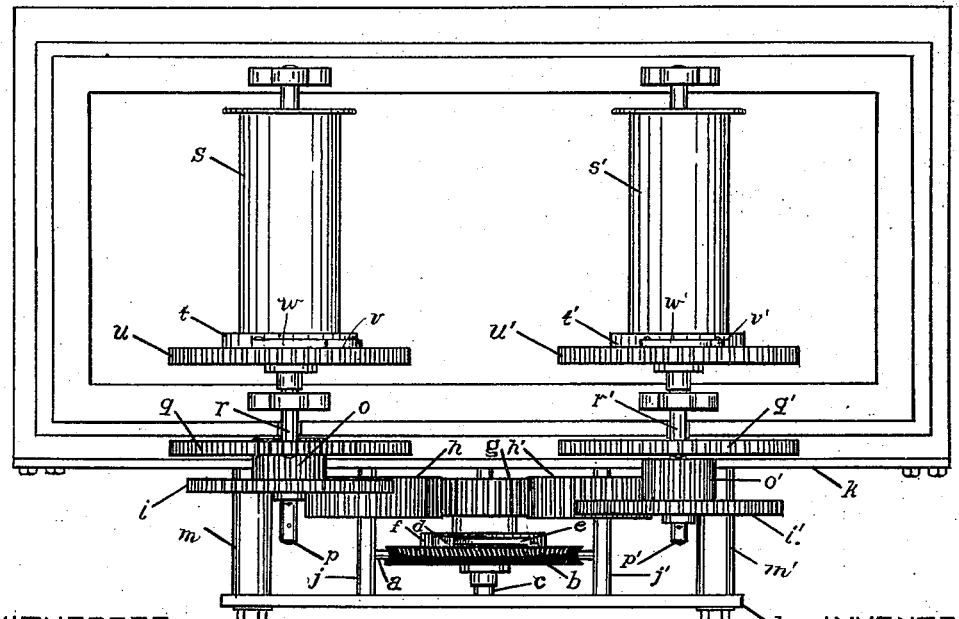

Of the accompanying drawings forming a part of this specification, Figure 1 represents the side view of the bed, or main frame of a tower clock, with the entire winding device, from the shaft to which the motor is connected to and including the barrels on which the weight cords are to be wound. Fig. 2 represents the top view of the same. All the conditions of the winding device remain the same when a sprocket and chain are used in the place of a barrel or drum and cord, for suspending the weights.

Each reference letter indicates the same part in both figures.

$a$ represents a worm on a shaft $a'$ to which an electric or other motor is or may be attached.

$b$ represents a worm wheel operated by worm $a$, said wheel $b$ being arranged to turn loosely upon, and in one direction independently of the shaft $c$ on which it is mounted.

$d$ is a pawl mounted on wheel $b$ and held in engagement with the teeth of a ratchet $f$ by spring $e$.

$f$ is a ratchet wheel which with central gear $g$ is mounted rigidly on shaft $c$.

$h$ and $h'$ are intermediate or idle gears, one meshing with central gear $g$ and a gear $i$, and the other with central gear $g$ and a gear $i'$.

$j$ and $j'$ are the shafts on which intermediate gears $h$ and $h'$ are rigidly mounted.

The pivotal bearings for shafts $c$ $j$ and $j'$ are formed in the frame bar $k$, bar $l$, and pillars $m$ and $m'$, all mounted on the clock frame by means of the bar $k$, the latter being extended and bolted to the clock frame, as shown at $n$ and $n'$.

The gears $i$ and $i'$ are rigidly secured respectively to pinions or smaller gears $o$ and $o'$, said gears $i$ and $i'$ and pinions $o$ and $o'$ being mounted to run loosely and freely on studs $p$ and $p'$ of a length greater than the thickness of gears $i$, $o$, and $i'$, $o'$ and so located in relation to winding gears $q$ and $q'$ that, by sliding forward or backward the pinions $o$ and $o'$ can be put into or out of mesh respectively with winding gears $q$ and $q'$, the extremes of movement being shown by the positions of the two pinions $o$ $o'$ in Fig. 2.

The winding gears $q$ and $q'$ are rigidly fastened to the main arbors $r$ and $r'$ of the clock, to which arbors are also rigidly fastened the winding barrels or drums $s$ and $s'$ on which the weight cords are wound and the ratchets $t$ and $t'$ which communicate motion from the barrels to the time and striking movements.

$u$ and $u'$ represent the main wheels of the time and striking movements, said wheels being mounted loosely on the arbors $r$ and $r'$ and provided with clicks $v$ $v'$ which are pressed by springs $w$ $w'$ into engagement with the ratchets $t$ and $t'$. The wheels $u$ and $u'$ are shown in the drawings as of the same diameter as the gears $q$ and $q'$. Hence said wheels $u$ and $u'$ are indicated in Fig. 1 only by their arms or spokes.

The operation of winding the clock, either the time part or striking part, is accomplished, as follows: Suppose $s$ to represent the barrel or drum of the time part, and $s'$ to represent the barrel or drum of the striking part, and further suppose that both pinions $o$ and $o'$ have been moved to the outer ends of studs $p$ and $p'$ so that they do not mesh or engage with the gears $q$ and $q'$.

The operation of winding the time or striking part of the clock consists in winding the cord, on which the weight is suspended, on to the barrel of the part that is intended to be wound.

To prepare the time part for winding, slide the pinion $o$ toward the inner end of stud $p$, until the pinion $o$ comes into mesh with winding gear *q*. The motor connected with shaft *a'* being started, the worm *a* and worm wheel *b* are rotated in the direction indicated by the arrow *x* in Fig. 1. The motion of wheel *b* is transmitted to barrel *s* through the pawl *d*, ratchet *f*, central gear *g*, intermediate gear *h*, gear *i*, pinion *o* and winding gear *q*. The ratchet *t* is fast on barrel *s* and its teeth are formed so that the rotation of the barrel in the direction caused by the described rotation of the worm wheel *b* will cause the ratchet to slip under the pawl *v*, so that no motion is imparted to the main wheel *u* during the winding operation, said main wheel *u* being loose on arbor *r* and being engaged with the first pinion in the clock train, as usual. After sufficient cord shall have been wound on to the barrel, the direction of the motion of the motor is reversed, letting the cord unwind from the barrel until one of the teeth on ratchet *t* engages the end of the pawl on the side of main wheel *u*, thereby transferring the pressure of the weight suspended on the cord to the main wheel *u*, and through main wheel *u* to the train of the clock. In case the reversed rotation of the motor is continued after the tooth of the ratchet *t* engages the pawl on the side of wheel *u*, the worm gear *b* is enabled by its loose connection with the shaft *c* and central gear *g* to rotate independently, so that after the stopping of the winding device train by the engagement of a tooth on ratchet *t* with the pawl *v* on the side of wheel *u*, the motor can continue to run indefinitely in said reverse direction, the worm wheel *b* only revolving, dragging the pawl *d* harmlessly over the teeth of ratchet *f*; hence there can be no possible injury to the winding mechanism by the continued reversed rotation of the motor.

The striking part is wound in the same manner as the time part by transferring the motion of the motor from the time part to the striking part, this being accomplished by slipping the pinion *o* out of mesh with winding gear *q*, and engaging pinion *o'* with winding gear *q'*.

The operation of winding the striking part is the same as that of winding the time part.

It will be seen that the central gear *g* and the gears *h*, *i*, *o* and *q* constitute a gear train which imparts motion to a winding barrel, the gears *g* and *q* being the end members of the train, and that the worm gear *b* constitutes a motor driven wheel, which is contiguous to the central gear and is operatively engaged therewith only when rotated in one direction, said motor driven wheel being loose and adapted to rotate independently in the opposite direction. I believe it to be new to combine with a winding train a motor driven wheel which is operative to impel said train only when rotated in one direction. Hence I do not limit myself to the ratchet *d* and pawl *f* as the means for connecting the wheel *b* with the central gear *g* and may use any other suitable means to accomplish the described result. Neither do I limit myself to the worm *a* as the means for imparting motion from the motor to the wheel *b*.

It is obvious that so far as the advantages conferred by the described engagement of the wheel *b* with the central gear *g*, is concerned, a single train of gears communicating motion from the wheel *b* to a single winding barrel will be within the scope of my invention. Hence I do not limit myself to the employment of a plurality of trains and a plurality of winding barrels. In all cases however when the clock has a time part and a striking part it will be desirable to make one motor serve for both parts, as here shown, and in this case it is manifestly very desirable to provide for either the simultaneous or the independent winding of the two parts. This provision is made by the movable gears in the two trains, said movable gears being one of the important features of my invention.

It is obvious that more than two trains may be employed if desired all operated from the motor driven gear *b* and central gear *g*.

I claim—

1. A clock winding mechanism, comprising in its construction a train of gears, a winding barrel or drum affixed to the gear at one end of the train, a motor driven wheel loosely mounted on the shaft of the gear at the other end of the train, and a ratchet and pawl connection between said shaft and wheel, whereby the wheel is positively engaged with the train when rotated in one direction, the wheel being adapted to rotate loosely when rotated in the opposite direction, the said train including an intermediate gear which is movable into and out of engagement with the adjacent gears, whereby the train may be made inoperative, as set forth.

2. In a clock winding mechanism, the combination of a winding barrel, a ratchet wheel affixed thereto, the main wheel loosely mounted on the shaft of said barrel and provided with a pawl adapted to engage said ratchet, a train of gears, one end member of which is affixed to the shaft of said barrel, a worm wheel loosely mounted on the shaft of the other end member of said train, a ratchet affixed to the last mentioned shaft, and engaged with a pawl on said worm wheel and a motor driven worm engaged with said worm wheel, the said train including an intermediate gear which is movable into and out of engagement with the adjacent gears, whereby the train may be made inoperative, as set forth.

3. In a clock winding mechanism, the combination of a winding barrel, a ratchet wheel affixed thereto, the main wheel loosely mounted on the shaft of said barrel and provided with a pawl adapted to engage said ratchet, a gear *q* affixed to said shaft, a pinion *o* meshing with the gear *q* and a gear *i* affixed to said pinion, both adapted to slide on their supporting stud to throw the pinion into and out of engagement with the gear *q*, the gears *h* and *g* completing the train of which the gear $q$, pinion $o$, and gear $p$ are members, the ratchet $f$ affixed to the shaft of the gear $g$, the worm wheel $b$ loosely mounted on the said shaft and provided with a pawl engaging the said ratchet, and a motor driven worm engaged with said worm wheel, as set forth.

4. In a clock winding mechanism, the combination of a central gear, such as $g$, a motor driven winding wheel operatively engaged with said central gear when rotated in one direction, and adapted to rotate indepenently in the other direction, a plurality of gear trains, the inner members of which mesh with the said central gear, each train having a movable member whereby it may be made inoperative, and a plurality of winding barrels engaged with the outer members of said trains, as set forth.

In testimony whereof I have signed my name to this specification, in the presence of two subscribing witnesses, this 6th day of December, A. D. 1892.

RUFUS B. CARR.

Witnesses:
A. D. HARRISON,
ARTHUR W. CROSSLEY.